United States Patent
Profeta et al.

[11] Patent Number: 6,152,826
[45] Date of Patent: Nov. 28, 2000

[54] IMPACT UNIVERSAL JOINT

[75] Inventors: Vincent L. Profeta, Newbury, Ohio; Kenneth Taggart, Columbia, Pa.

[73] Assignee: Hand Tool Design Corporation, Wilmington, Del.

[21] Appl. No.: 09/069,461

[22] Filed: Apr. 29, 1998

[51] Int. Cl.$^7$ ..................................................... F16D 3/18
[52] U.S. Cl. .......................... 464/159; 464/106; 464/112; 464/156
[58] Field of Search ..................................... 464/106, 109, 464/112, 147, 100, 153, 157, 156, 159; 403/135, 122

[56] References Cited

U.S. PATENT DOCUMENTS

| | | | |
|---|---|---|---|
| 76,819 | 4/1868 | Ross | 464/159 |
| 797,820 | 8/1905 | Peck | 464/106 |
| 919,651 | 4/1909 | Spicer . | |
| 1,335,913 | 4/1920 | Orbom | 464/159 |
| 1,868,891 | 7/1932 | Faudi | 403/122 |
| 2,136,947 | 11/1938 | Morgan | 464/156 |
| 2,441,347 | 5/1948 | Dodge . | |
| 2,760,358 | 8/1956 | Helm et al. | 464/106 |
| 2,854,829 | 10/1958 | Porter | 464/159 |
| 2,976,702 | 3/1961 | Peitsch | 464/182 |
| 3,054,275 | 9/1962 | Ongaro | 464/156 |
| 3,775,997 | 12/1973 | Carman . | |
| 3,826,108 | 7/1974 | Bradel, Jr. et al. | 464/156 |
| 4,141,225 | 2/1979 | Varner | 464/156 |
| 4,188,801 | 2/1980 | Hugh et al. . | |
| 4,370,869 | 2/1983 | Jonassen | 464/156 |
| 4,482,266 | 11/1984 | Kaneko | 403/122 |
| 5,007,880 | 4/1991 | Walker | 464/159 |
| 5,152,628 | 10/1992 | Broszat et al. | 403/122 |
| 5,503,236 | 4/1996 | Tibbitts . | |
| 5,527,220 | 6/1996 | Geczy | 464/153 |
| 5,573,463 | 11/1996 | Arlt . | |
| 5,782,574 | 7/1998 | Henkel | 403/122 |
| 5,851,151 | 12/1998 | Reynolds | 464/106 |

FOREIGN PATENT DOCUMENTS 914232  10/1946  France ................................. 464/156

*Primary Examiner*—Lynne H. Browne
*Assistant Examiner*—Greg Binda
*Attorney, Agent, or Firm*—Leonard Bloom

[57] ABSTRACT

An impact universal joint has a socket which receives a swivel head. A flat leaf spring with dependent members is connected to the upper face of the socket. The swivel head is substantially a sphere with spaced-apart lugs formed around a circumference of the sphere. Axially connected to the sphere is a body having an opening distal from the sphere. The opening receives a power driver. The socket has a cavity formed therein which cooperates with the spherical swivel head. The cavity has a plurality of spaced-apart channels formed therein dividing the cavity into respective segments. Each channel of the cavity receives a respective lug of the swivel head. Each lug has an outer face which is curved to cooperate with the outer wall of the respective channel. Each lug further has a pair of opposite driving faces which are convex to allow the spherical swivel head to swivel within the socket without binding. The driving faces of the lugs direct forces onto the walls of the respective channel within the socket to produce rotation of the socket. The socket has an opening/drive formed in the end of the socket opposite to the cavity. The dependent members of the leaf spring contact the sphere on the swivel head and are disposed juxtapositioned to the respective segments of the cavity between the channels in the cavity. The spring retains the swivel head within the socket and provides a low level load to hold the swivel head in any position.

12 Claims, 8 Drawing Sheets

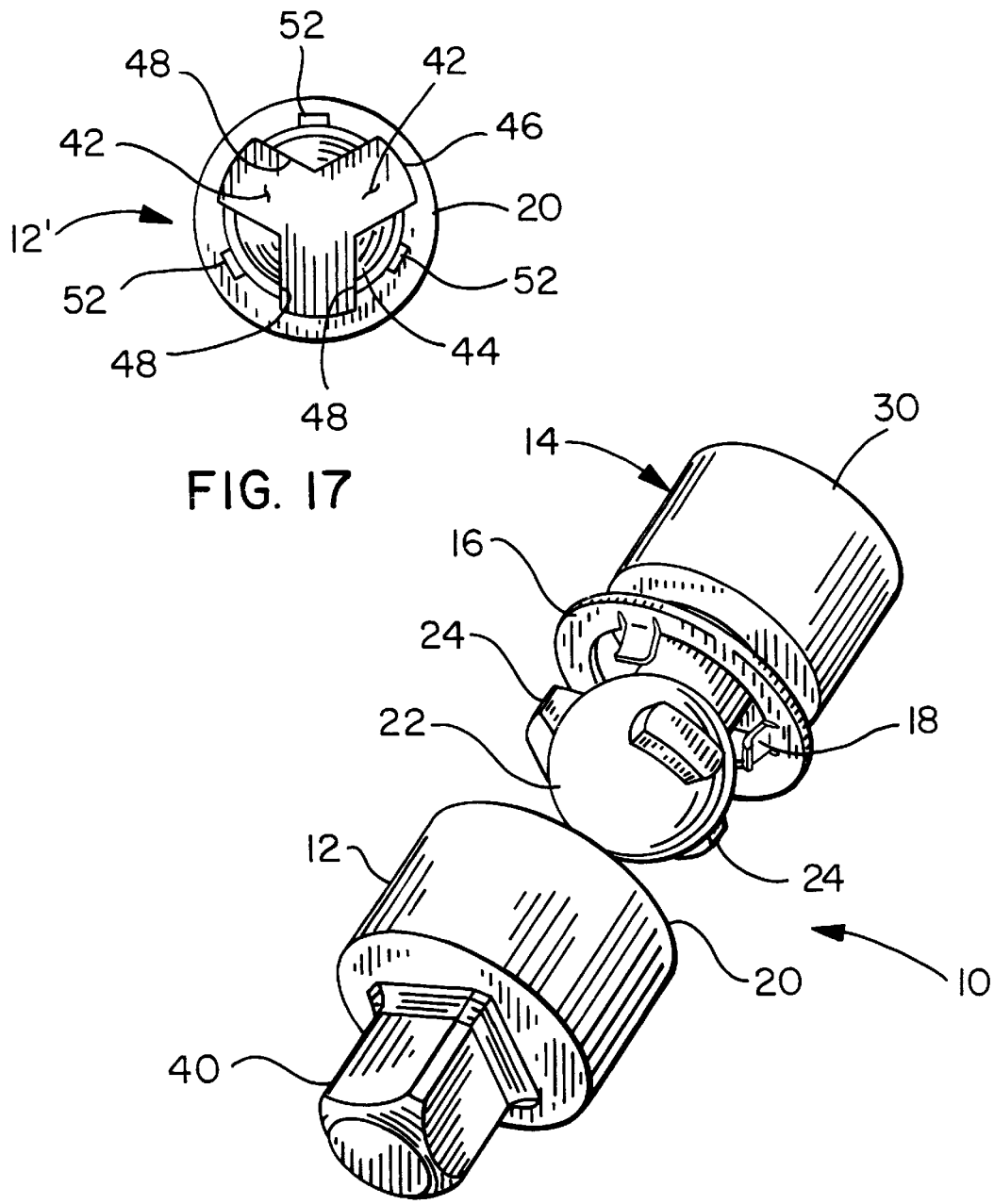

IMPACT UNIVERSAL JOINT

The present application relates to a universal joint and more particularly, to a universal joint which may be used with power tools to deliver impact to a fastener.

BACKGROUND OF THE INVENTION

Impact universal joints are used for installing and removing fasteners or other driven workpieces. This is necessary where straight (0° offset) access is difficult or impossible. There are numerous industrial applications. The average citizen most commonly encounters impact universal joints in the automobile garage where the mechanic uses the socket with a power driver to remove and install lug nuts on the wheels of the automobile. The power driver with the impact universal joint provides a means to apply torque to the workpiece and to periodically add an impact to further rotate the workpiece.

Impact universal joints have been known for many years with only a single design dominating the market. This is the "pin and ball" design. In these devices, a ball is received in a torque and impact socket and a pin is disposed in the wall of a socket and through a slot in the ball. The assembly is spring loaded between the ball and the socket interior bottom. The forces on the device are carried, in shear, by the cross-sectional area of the pin. Under the impact and torsinal forces applied, the pin is the most likely member to fail. Increasing the diameter of the pin reduces failure of the pin but causes the slot in the ball to be widened, which decreases the cross-sectional area of the ball which then weakens the ball and becomes a failure point (U.S. Pat. No. 2,441,347 to Dodge).

In U.S. Pat. No. 4,188,801, Hugh et al use a quadrified ball in a square socket. However, in this universal joint, all of the load is carried by the quadrified ball. A force vector analysis shows that the forces are directed to the socket in a manner which applies a significant portion of the forces in a radial direction as opposed to a tangential direction necessary to turn the socket. This applies unwanted radial expansion loads to the sides of the socket and reduces the amount of torque and impact transmitted.

The applicant is also aware of other tools which utilize spherical coaxial members such as U.S. Pat. No. 3,775,997 to Carman, U.S. Pat. No. 5,503,236 to Tibbitts and U.S. Pat. No. 5,573,463 to Arlt. Carman and Tibbitts disclose teeth or lands which are formed on the sphere but are too costly for the consumer tool market.

U.S. Pat. No. 919,651 to Spicer discloses a universal joint which is calculated to withstand heavy pressure due to the transmission of heavy loads with joint members at a considerable angle. The head has spherical curvature. Bearing boxes are arranged to slide in portions of the transverse slot, the sides of said portions serving as guides for the boxes. The bearing boxes are shoes for pivot pin, and, where very light loads are to be transmitted, may not be required with pin sliding and pivoting on guides of a member.

BRIEF SUMMARY OF THE INVENTION

It is an object of the present invention to provide an impact universal joint which efficiently transmits torque to a workpiece while allowing angular misalignment of the swivel head relative to the socket.

It is further an object of the present invention to efficiently transmit torque from lugs on the swivel head to channels within the socket.

It is still another object of the present invention to load the assembly in a secure fashion which does not deteriorate with age and allows the transmission of all axial impact pulses to the socket and/or fastener.

In accordance with the teachings of the present invention, there is disclosed an impact universal joint to transmit force efficiently from a power tool to a workpiece through an angular misalignment, the impact universal joint having a substantially spherically-shaped swivel head. A plurality of spaced-apart lugs are formed in a plane about a circumference of the spherically-shaped swivel head. A body is axially connected to the swivel head. An opening is formed in the body distal from the swivel head. A socket having a cavity formed therein is provided, the cavity receives and cooperates with the swivel head. The cavity has a plurality of spaced-apart channels formed therein dividing the cavity into respective segments. Each channel has a pair of side walls, wherein each respective channel of the cavity receives the respective lug of the swivel head between the side walls thereof. The socket has connecting means formed therein distal from the swivel head. A resilient retaining means is connected to the socket at an interface between the socket and the swivel head. The resilient retaining means retains the swivel head -within the socket and provides a low level load to hold the swivel head in a desired position with respect to the socket. In this manner, driving force applied to the body is transmitted to the socket.

In further accordance with the teaching of the present invention there is disclosed an impact universal joint to transmit force form a tool. The impact universal joint has a substantially spherically-shaped swivel head. A plurality of spaced-apart lugs are formed in a plane about a circumference of the swivel head. A body is axially connected to the swivel head. A connecting means is formed on the body distal from the swivel head for connection to the tool. A socket has a cavity formed therein, the cavity receives and cooperates with the swivel head. Means is provided in the cavity to contact the lugs on the swivel head to transmit force from the swivel head to the socket.

These and other objects of the present invention will become apparent from a reading of the following specification taken in conjunction with the enclosed drawings.

BRIEF DESCRIPTION OF THE DRAWINGS

FIG. 17 is a top plan view of the socket showing clearance channels for the dependent members of the resilient means.

FIG. 18 is a perspective partial view showing the body having a square drive opposite from the cavity.

DESCRIPTION

Figure 1:
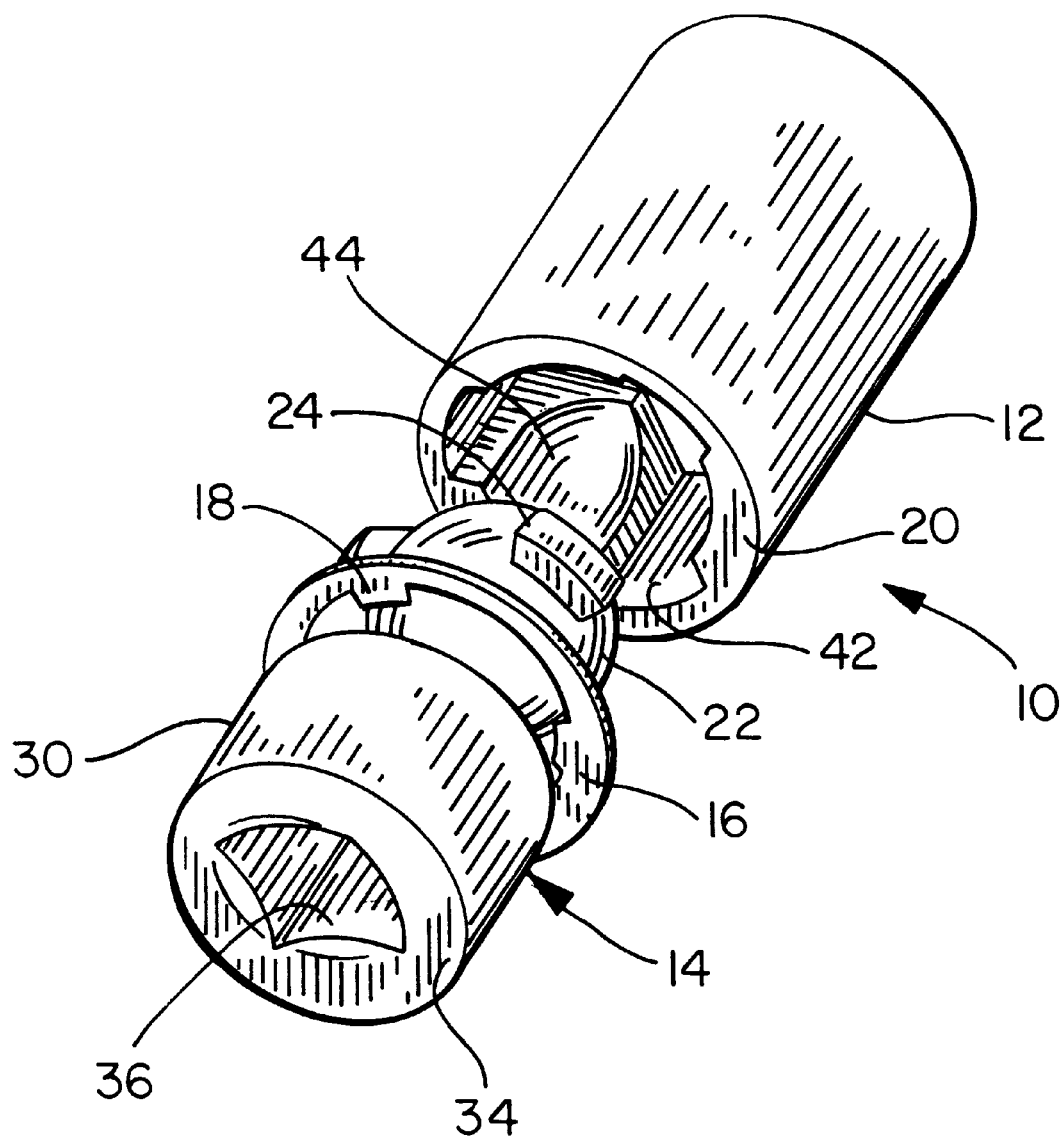
FIG. 1 is a perspective exploded view of the present invention shown from the body of the swivel head toward the cavity of the socket.
Figure 2:
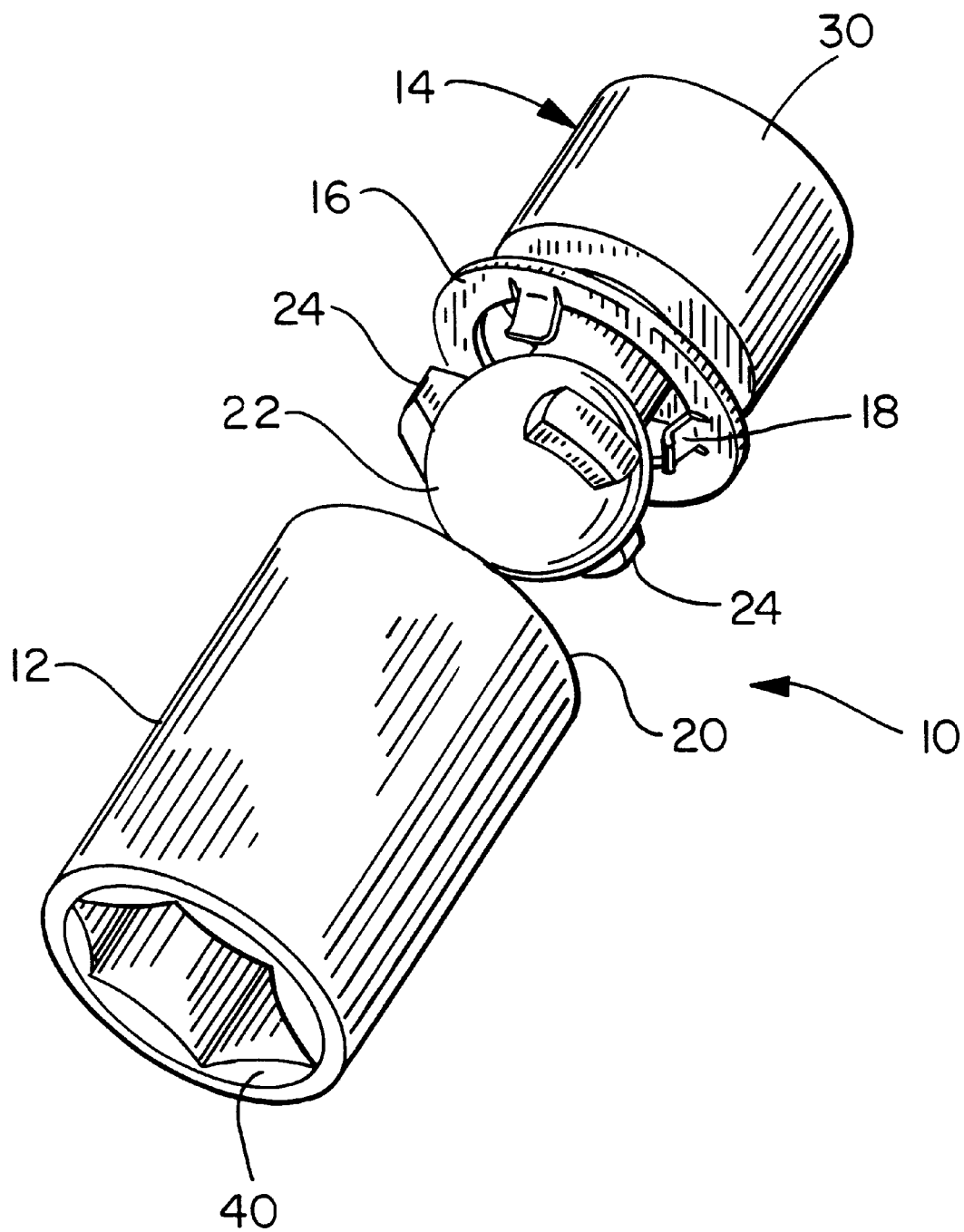
FIG. 2 is a perspective exploded view of the present invention shown from the socket toward the swivel head and the body of the swivel head.

The impact universal joint 10 of the present invention has a socket 12 which receives a swivel head 14. A resilient retaining means (flat leaf spring) 16 with dependent members 18 is connected to the upper face 20 of the socket 12 (FIGS. 1 and 2).

Figure 3:
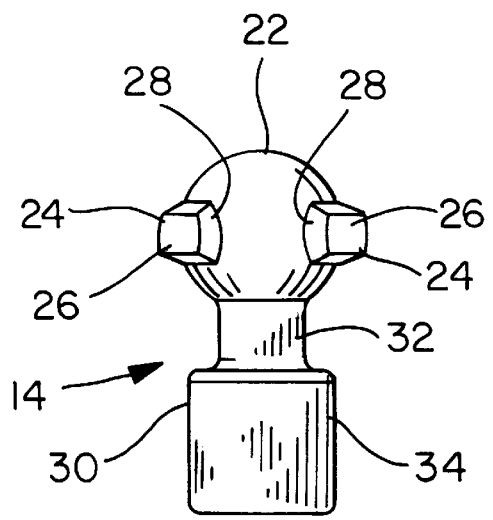
FIG. 3 is a side elevation view of the swivel head and the body.
Figure 4:
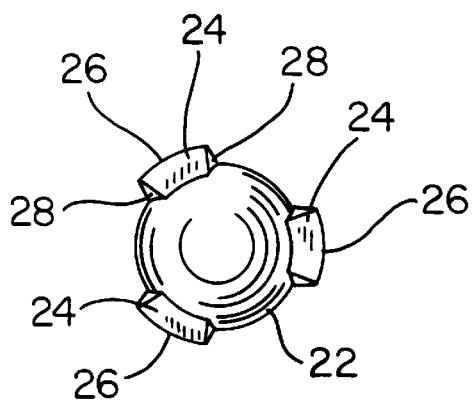
FIG. 4 is a top plan view of the swivel head and the body.
Figure 5:
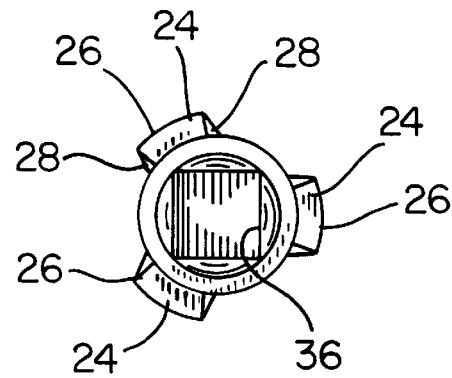
FIG. 5 is a bottom plan view of the swivel head and the body.
Figure 6:
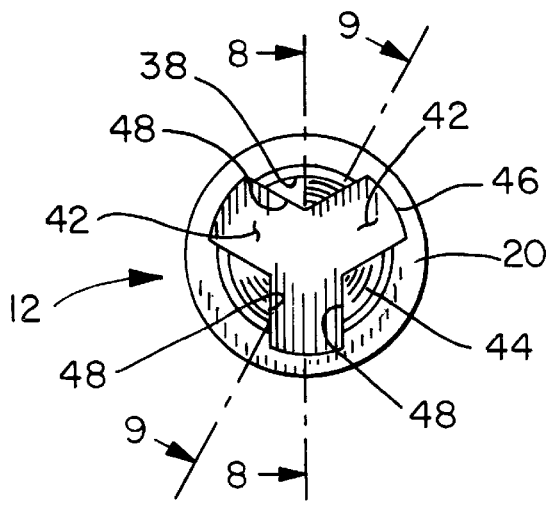
FIG. 6 is a top plan view of the socket.
Figure 7:
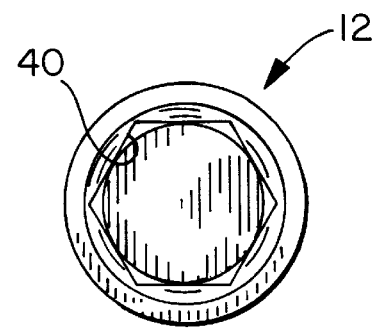
FIG. 7 is a bottom plan view of the socket.
Figure 8:
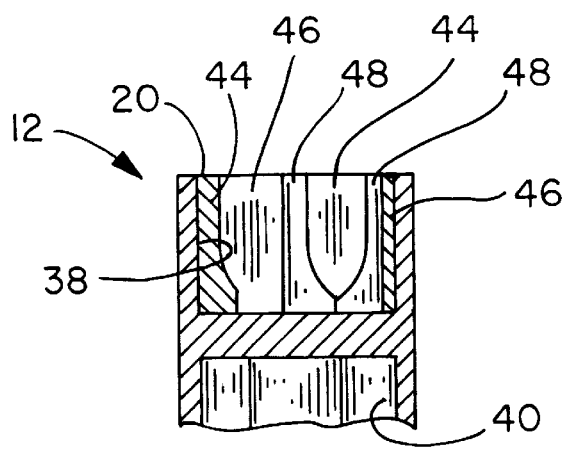
FIG. 8 is a cross section view taken across the lines 8—8 of FIG. 6.
Figure 9:
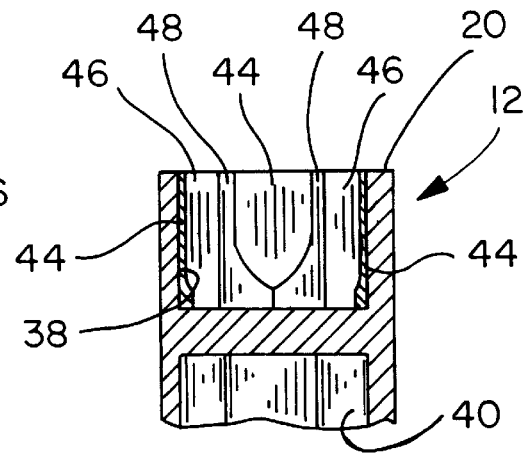
FIG. 9 is a cross section view taken across the lines 9—9 of FIG. 6.
Figure 10:
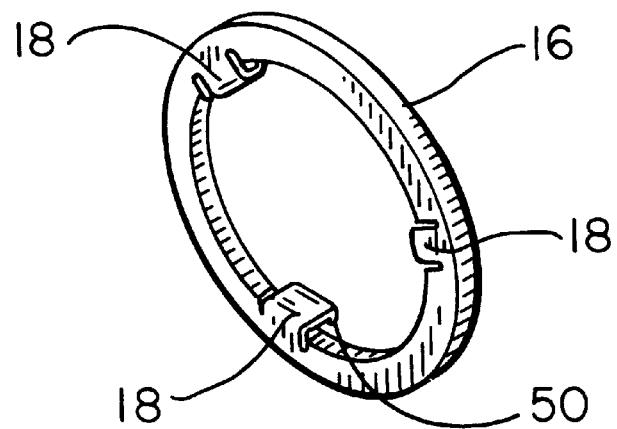
FIG. 10 is a perspective view of the spring.
Figure 11:
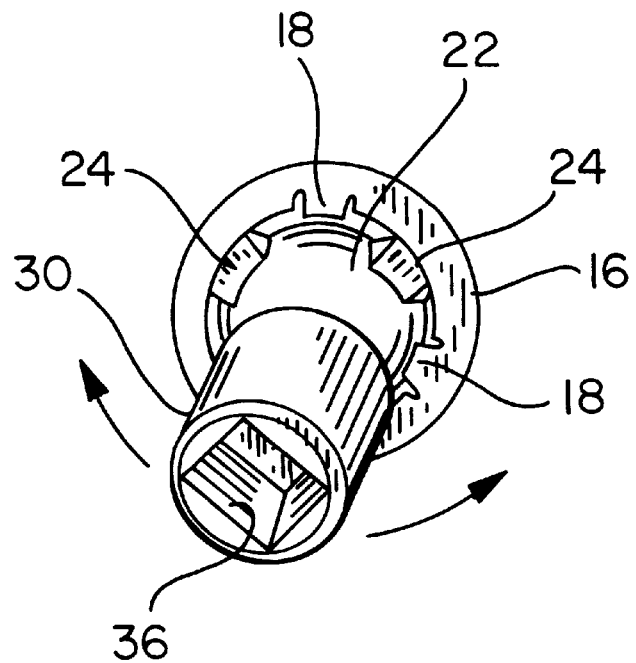
FIG. 11 is a top view of the present invention showing the swivel head swivelled to one direction to the greatest extent possible such that the dependent members of the spring are viewed juxtapositioned to the segments in the cavity and showing a lug on the swivel.
Figure 12:
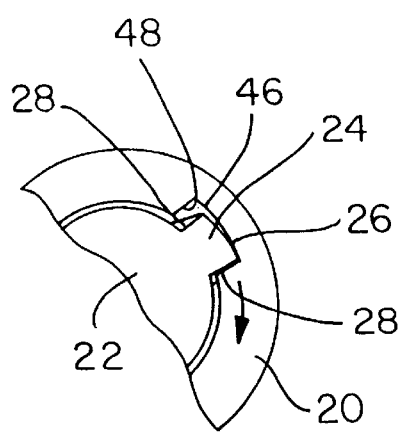
FIG. 12 is an enlarged partial cut-away top plan view showing the lug on the sphere engaging the wall of the channel in the socket to drive the socket in a clockwise direction.
Figure 13:
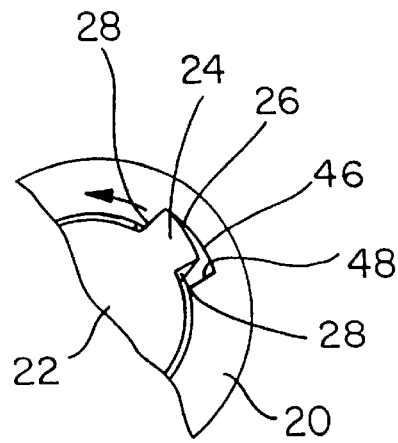
FIG. 13 is the view of FIG. 12 showing drive in a counterclockwise direction.
Figure 14:
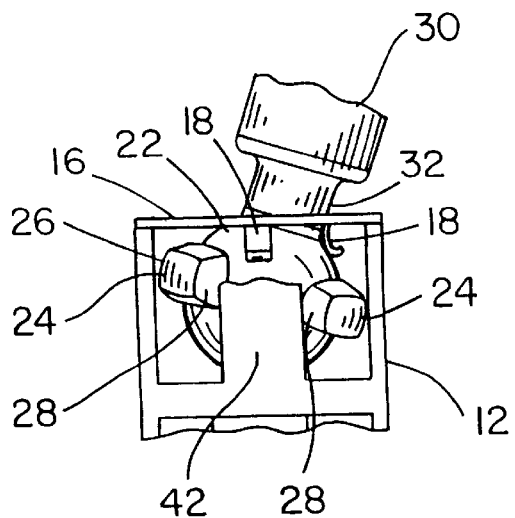
FIG. 14 is a partially cut-away side view showing the swivel head at an angle to the socket and driving the socket by engagement of the driving faces of the lugs with the side walls of the channels.
Figure 15:
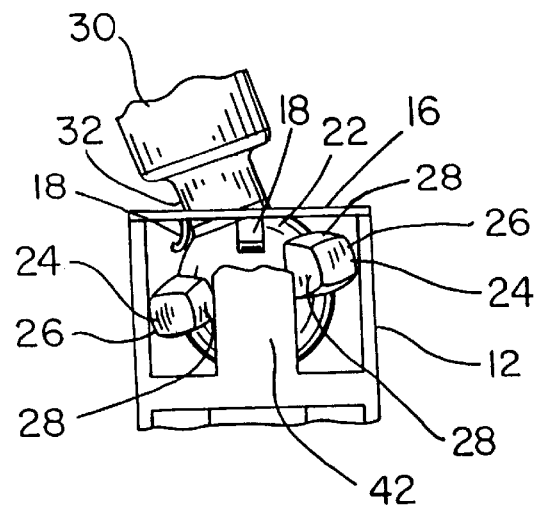
FIG. 15 is the view of FIG. 14 with the swivel head at a different angle.

As shown in FIGS. 3–5, the swivel head 14 has a substantially spherically portion (sphere) 22. A plurality of spaced-apart lugs 24 are formed on the sphere 22. The lugs 24 are formed in a plane around a circumference of the sphere 22. Preferably, the lugs are equispaced. Each lug 24 has an outer face 26 which is convex curved as will be described. Each lug 24 further has a pair of opposite driving faces 28 which are convex and in planes parallel to one another. The planes of the driving faces 28 are substantially parallel to the plane of the side wall 48 of the socket 12.

Axially connected to the sphere 22 is a body 30. The body 30 has a neck portion 32 intermediate between the sphere 22 and a cylindrical portion 34. An opening 36 is formed in the cylindrical portion 34 distal from the sphere 22. Preferably, the opening 30 is square to receive the drive tang of a power driver such as an impact driver (not shown).

Figure 16:
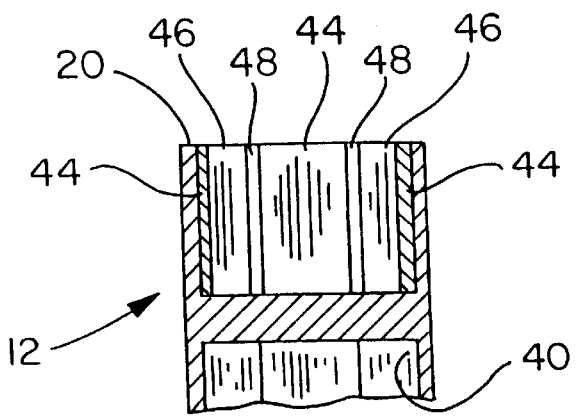
FIG. 16 is a cross section of the embodiment in which the segments ate straight-walled.
Figure 19:
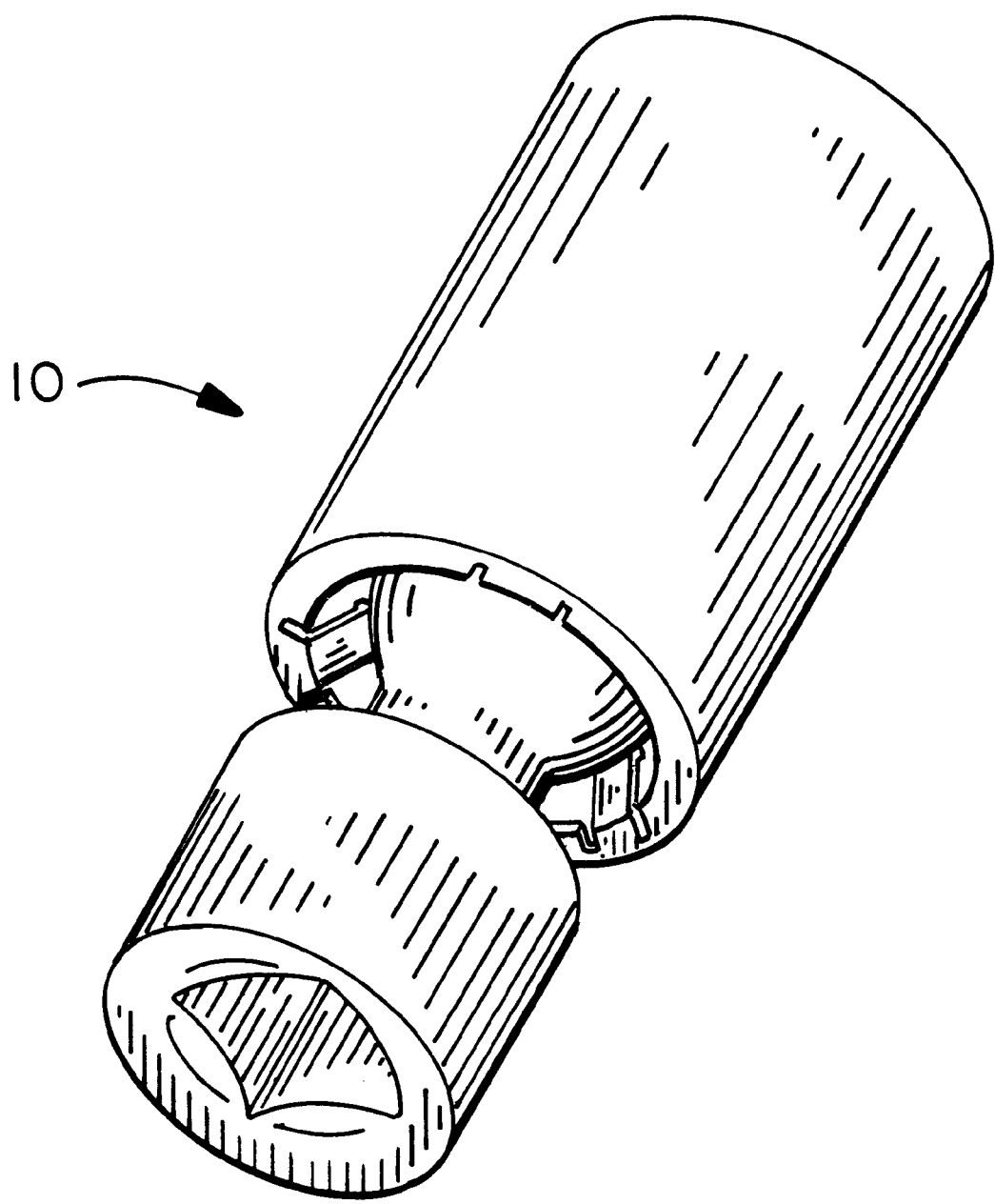
FIG. 19 is a perspective view of the present invention.

Referring to FIGS. 6–9, the socket 12 has a cavity 38 formed in one end and a connecting means 40 formed in the opposite end. Preferably, the connecting means 40 is a hexagonal opening to receive a fastener or other driven workpiece. The connecting means 40 may have other shapes such as square, spline etc. for specific uses and may be a square drive tang to receive accessories or sockets of varying sizes (FIG. 18). The socket 12 has an upper face 20 which, preferably, is flat or shaped to retain the resilient retaining means 16. The cavity 38 has a plurality of spaced-apart channels 42 formed therein dividing the cavity into segments 44. The number of channels 42 corresponds with the number of lugs 24 formed on the sphere 22 in the swivel head 14. Preferably, the channels 42 are equispaced so that each of the segments 44 are equal in size. Preferably, each channel 42 has a concave curved outer wall 46, the curvature cooperating with the convex curvature of the outer face 26 of the respective lugs 24 on the sphere 22 of the swivel head 24. Each channel 42 further has parallel substantially-flat side walls 48. The segments 44 may have a lower portion which is concave. However, the segments 44 may be straight-walled without any curvature (FIG. 16). The sphere 22 of the swivel head 14 is received in the cavity 38. In the embodiment with curved segments 44, the sphere 22 cooperates with the segments 44 in the cavity 38; each segment 44 being wider where adjoining the upper face of the sockets and having a lower portion which is concave having a curvature to cooperate with the sphere 22.

The sphere 22 is received in the cavity 38 such that each lug 24 on the sphere 22 is disposed in a corresponding channel 42 in the cavity 38 with the outer face 26 of the respective lug 24 cooperating with the respective outer wall 46 of each channel 42. The driving faces 28 of each lug 24 are opposed to the side walls 48 of the respective channel. The convex driving faces 28 of the respective lugs 24 allow the sphere 22 to swivel without binding within the segments 44 in the cavity 38 while the driving face 28 maintains sliding contact with the straight side walls of the respective channel 42 and the outer face 26 on the respective lug 24 maintains sliding contact with the outer wall 46 of the respective channel 42 (FIGS. 11–15). Due to the configuration of the faces of the lugs 24 and the configuration of the walls of the channels 42, force applied to the body 30 of the swivel head 14 is transmitted to the socket. The transmission of force is very efficient because the driving faces 28 on the lugs 24 are able to transmit forces perpendicularly to the side walls 48 of the channel 42 irrespective of the angle between the swivel head 14 and the socket 12.

A resilient retaining means 16, such as a flat leaf spring is connected to the socket 12 at the interface between the socket 12 and the swivel head 14. Preferably, the spring 16 is mounted on the upper face 20 of the socket. The spring 16 has a plurality of dependent members 18 formed thereon. The dependent members 18 are oriented toward the socket 12 and contact the sphere 22 as it is disposed within the cavity 38. The dependent members 18 are spaced apart and are juxtapositioned to the respective segments 44 in the cavity 38 and between the channels 42. In this manner, the resilient retaining means 16 holds the swivel head 14 securely within the cavity 38 while not restricting the swivelling or angular movement of the swivel head with respect to the socket. The dependent members 18, at the end distal from the spring 16, are formed with a return bend 50. The return bend 50 contacts the sphere 22 on a surface rather than the contact being on an edge. This reduces wear on both the sphere 22 as well as on the member 18 and also facilitates swivel movement of the swivel head 14. The spring 16 also provides a low level load to hold the swivel head in any selected position. This enables the impact universal joint 10 to effectively and efficiently transmit forces from the power driving tool, through the swivel head and socket, to the workpiece. The resilient retaining means 16 does not deteriorate with age or use as does a coil spring which is commonly found in impact joints of the prior art.

It is also preferred, for manufacturing purposes, to form clearance channels 52 in the segment 44 in the cavity 38 which extend from the upper face 20 of the socket 12' to the bottom of the cavity 38. The clearance channels are opposite from the channels 42. The dependent members 18 of the resilient means 16 are disposed in the respective clearance channels to provide clearance for the dependent members 18. This reduces the tolerance sensitivity of the dependent members 18 (FIG. 17).

A further advantage of the impact universal joint of the present invention is that axial impact forces are transmitted to the driven member because of the configuration of the present invention as described above and because of the spring retaining method. In most prior art, the axial impact forces are not fully utilized. Thus, the present invention is more effective in the removal of "frozen" fasteners where axial impact complements the radial torque. The device of the present invention transmits force through 360° of rotation of the swivel head about the socket.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. An impact universal joint to transmits force efficiently from a power tool to a workpiece through an angular misalignment, the impact universal joint comprising a non-truncated spherical swivel head, three equally spaced-apart lugs extending outwardly from the spherical swivel head and formed in an equatorial plane about a circumference of the spherical swivel head, each lug having a pair of opposite convex driving faces, a body axially connected to the swivel head, an opening formed in the body distal from the swivel head, a socket having a cavity formed therein, the cavity receiving and cooperating with the swivel head, the cavity having a plurality of spaced-apart channels formed therein dividing the cavity into respective segments, each channel having a pair of side walls, wherein the side walls of each respective channel of the cavity receive the respective lug of the swivel head between the side walls thereof, the socket having connecting means formed therein distal from the swivel head, an axially resilient retaining means connected to the socket at an interface between the socket and the swivel head, the resilient retaining means retaining the swivel head within the socket and providing a low level load to hold the swivel head in a desired position with respect to the socket, wherein driving force applied to the body is transmitted axially and radially to the socket.

2. The joint of claim 1, wherein the connecting means on the socket is an opening to receive and cooperate with a fastener.

3. The joint of claim 1, wherein the connecting means on the socket is a male drive to receive an accessory.

4. The joint of claim 1, wherein each lug has a respective outer face curved to cooperate with an outer wall of the respective channel, wherein the spherical swivel head swivels within the socket without binding, wherein the driving forces being applied to the body are transmitted to the driving faces on the swivel head such that the driving faces of the respective lugs direct the force perpendicularly onto the side walls of the respective channels within the socket to produce rotation of the socket.

5. The joint of claim 1, wherein the plane of the plurality of lugs is substantially perpendicular to a center line through the body and swivel head.

6. The joint of claim 1, wherein each segment is concave and cooperating with the spherical swivel head.

7. An impact universal joint to transmit force efficiently from a power tool to a workpiece through an angular misalignment the impact universal joint comprising a substantially spherically-shaped swivel head, a plurality of spaced-apart lugs formed in a plane about a circumference of the spherically-shaped swivel head, a body axially connected to the swivel head, an opening formed in the body distal from the swivel head, a socket having a cavity formed therein, the cavity receiving and cooperating with the swivel head, the cavity having a plurality of spaced-apart channels formed therein dividing the cavity into respective segments, each channel having a pair of side walls, wherein each respective channel of the cavity receives the respective lug of the swivel head between the side walls thereof, the socket having connecting means formed therein distal from the swivel head, a resilient retaining means connected to the socket at an interface between the socket and the swivel head, the resilient retaining means retaining the swivel head within the socket and providing a low level load to hold the swivel head in a desired position with respect to the socket, wherein driving force applied to the body is transmitted to the socket, wherein the resilient retaining means is a leaf spring having a plurality of dependent members formed thereon, wherein the dependent members contact the spherical swivel head and are juxtapositioned to the respective segments of the cavity between the channels in the cavity.

8. An impact universal joint to transmit force from a tool comprising:

a non-truncated spherical swivel head, three equally spaced-apart lugs extending outwardly from the spherical swivel head and formed in an equatorial plane about a circumference of the swivel head, a body axially connected to the swivel head, a connecting means formed on the body distal from the swivel head for connection to the tool, a socket having a cavity formed therein, the cavity receiving and cooperating with the swivel head, wherein axial force is transmitted from the non-truncated spherical swivel head to the socket, and means in the cavity to contact the lugs on the swivel head to transmit radial force from the swivel head to the socket.

9. The joint of claim 8, further comprising an axially resilient retaining means being connected to an interface between the swivel head and the socket.

10. The joint of claim 8, wherein the means in the cavity to contact the lugs on the swivel head are a plurality of spaced-apart channels formed in the cavity, each channel having a pair of side walls, wherein each respective channel receives a respective lug between the side walls and application of force to the swivel head is transmitted through the lugs to the side walls of the channels and to the socket.

11. An impact universal joint to transmit force from a tool comprising:

a non-truncated spherical swivel head, a plurality of spaced-apart lugs formed in a plane about a circumference of the swivel head, a body axially connected to the swivel head, a connecting means formed on the body distal from the swivel head for connection to the tool, a socket having a cavity formed therein, the cavity receiving and cooperating with the swivel head, means in the cavity to contact the lugs on the swivel head to transmit force from the swivel head to the socket, an axially resilient retaining means being connected to an interface between the swivel head and the socket, and the resilient retaining means having a plurality of dependent members formed thereon, the dependent members contacting the spherical swivel head.

12. An impact universal joint to transmit force from a tool comprising:

a substantially spherically-shaped swivel head, a plurality of spaced-apart lugs formed in a plane about a circumference of the swivel head, a body axially connected to the swivel head, a connecting means formed on the body distal from the swivel head for connection to the tool, a socket having a cavity formed therein, the cavity receiving and cooperating with the swivel head, means in the cavity to contact the lugs on the swivel head to transmit force from the swivel head to the socket, a resilient retaining means being connected to an interface between the swivel head and the socket, the resilient retaining means having a plurality of dependent members formed thereon, the dependent members contacting the spherical swivel head, and further comprising a plurality of clearance channels formed in the cavity, wherein the plurality of dependent members are each disposed in a respective clearance channel.

\* \* \* \* \*